(No Model.)
J. F. McLAUGHLIN.
CAR BRAKE.
No. 432,203.                    Patented July 15, 1890.
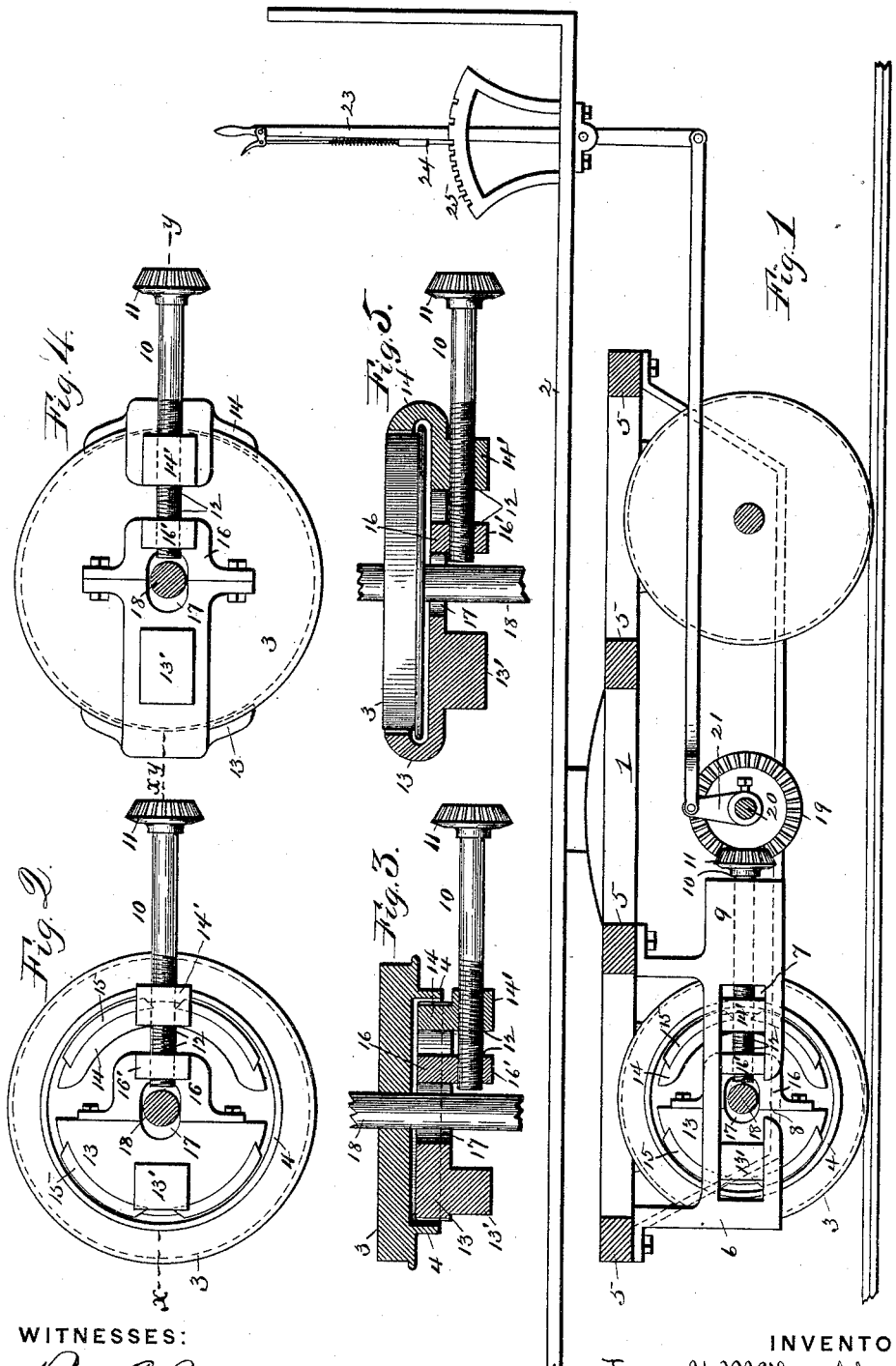
WITNESSES:
Percy C. Bowen
F. J. Chapman
INVENTOR
James F. McLaughlin,
By Joseph Lyon,
Attorney

UNITED STATES PATENT OFFICE.

JAMES F. McLAUGHLIN, OF PHILADELPHIA, PENNSYLVANIA.

CAR-BRAKE.

SPECIFICATION forming part of Letters Patent No. 432,203, dated July 15, 1890.

Application filed January 9, 1890. Serial No. 336,346. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Brakes for Railway-Carriages, of which the following is a specification.

My invention has reference to improvements in brakes for railway-carriages and other vehicles, the object being to provide a brake which shall so act upon a wheel or wheels of the vehicle as to leave the wheels' axle unaffected by the braking operation— that is to say, the braking operation will not tend to bend or otherwise put under strain the axle, as is done in ordinary brakes, where a brake-shoe is applied to the rim of the wheel on one side of the axle, thereby tending to bend or distort the latter.

In my improved brake I apply brake-shoes either to an internal bearing-flange of the wheel or to the tread or rim of the wheel on opposite sides of the axle, so that the latter remains absolutely free. The movement of the brake-shoes I effect positively in either direction by the direct application to these shoes of a right and left hand screw, which is actuated by suitable gearing and lever connection from any part of the vehicle.

In the accompanying drawings, which form a part of this specification, I have illustrated two forms of my improved brake; but it will be understood by those skilled in the art that other forms of brake may be used without departing from the fundamental idea embodied in my invention.

I have shown in Figure 1 a longitudinal central section of a railway-car with my brake mechanism applied; in Fig. 2, an elevation, upon an enlarged scale, of the inner face of a car-wheel with my brake fitted to it, and in Fig. 3 a section on line *x x*, Fig. 2. Fig. 4 represents an elevation of a modified form of my improvement as applied to a railway-car wheel of ordinary construction, and Fig. 5 is a section on line *y y* of Fig. 4.

Like numerals of reference indicate like parts throughout the drawings.

Referring now particularly to Figs. 1, 2, and 3, there is shown an ordinary truck 1 of a railway-car, which in any suitable or ordinary manner supports the car 2 proper. The car-wheels 3, to which the brakes are intended to be applied, are constructed on their inner faces with a bearing-flange 4, and to the cross-timbers 5 5 of the truck are secured frames 6— one for each brake-wheel—and extending horizontally and parallel with the inner face of said wheel. This frame 6 is made quite strong, and preferably of iron, and it is formed with a horizontal guideway 7, with an opening 8 in the lower wall, as shown in Fig. 1, so that the frame when in place will ride over the axle of the wheel, as shown, and the guideway will extend in the line of a diameter of the wheel. One end of the frame 6, where it extends beyond the guideway, is formed into a bearing 9 for the smooth portion of a shaft 10, which at one end carries a miter-gear 11, and which at the other end is provided with right and left hand screw-threads 12. This screw-threaded portion of shaft 10 extends longitudinally into the guideway 7. The brake-shoes 13 14, each provided with a steel bearing-face 15, dovetailed to the shoe, are fitted within the bearing-flange 4 of the wheel on opposite sides of the axle, and one of these brake-shoes 13 has a bracket 16 secured to it as an extension thereof, and registering-notches in the shoe 13 and bracket 16 form a slot 17 when the bracket is in position and secured to the shoe. The axle 18 of the wheel extends through this slot, so that the brake-shoe 13 may be moved a limited distance without interference with the axle. From the shoe 13 proper extends a rectangular lug 13' into the guideway 7 of frame 6, and similar lugs 14' 16' also extend into the guideway 7 from the brake-shoe 14 and from the bracket 16, respectively. The lugs 14' and 16' are formed with nuts, one for the reception of the right-hand screw-threads and the other for the reception of the left-hand screw-threads on the shaft 10. It will now be understood that by turning the shaft 10 in one direction the brake-shoes 13 14 will be spread apart until their steel bearing-faces forcibly bear upon the bearing-face of flange 4, thus braking the wheel without in any way or manner affecting the axle, and by turning the shaft 10 in the other direction the brake-shoes are moved away from the bearing-face of flange 4, thus releasing the wheel. Both movements of the brake-shoes are positive, and they are rigidly locked in any position. The shaft 10 is rotated by means of a miter-gear 19, meshing with the miter-gear 11, and mounted upon a counter-shaft 20, which is actuated by the crank 21, link or pitman 22, and lever 23, the latter being provided with a locking-pin 24, engaging a segmental rack 25, such as is used in the operation of railway-switches and other devices of this character.

In the modification shown in Figs. 4 and 5 the brake-wheel is of the ordinary type of car-wheels, and the shoes 13 14 are applied to the tread of the wheel on opposite sides of the axle. There is therefore used in this instance the same guide-frame 6 as in the case of the construction shown in Figs. 1, 2, and 3, and the same kind of lugs 13' 14' 16' extend from the shoes 13 and 14 and from the bracket 16, respectively. The effect of this second form of brake will be the same as that of the form first described—that is to say, it will brake the wheel on opposite sides of the axle, and will therefore leave the latter unaffected.

Having now fully described my invention, I claim and desire to secure by Letters Patent—

1. In a car-brake, the combination of a car-wheel provided on its inner face with a circular flange constituting an inner bearing-face, with two brake-shoes disposed on opposite sides of the axle and in operative relation to the bearing-face of the wheel, with mechanism for simultaneously actuating the brake-shoes, substantially as described.

2. In a car-brake, the combination of a car-wheel, and two brake-shoes disposed on opposite sides of the axle and in operative relation to a bearing-face of the wheel, with lugs projecting from the shoes into a guideway disposed parallel to a diameter of the wheel, and a right and left hand screw engaging said lugs for simultaneously actuating both brake-shoes, substantially as described.

3. In a car-brake, the combination of a pair of brake-shoes for each brake-wheel, disposed on diametrically-opposite sides of the same, with a separate right and left handed screw for each pair of brake-shoes, and gearing for actuating the independent screws from one point, substantially as described.

In testimony whereof I have signed my name to this specification in presence of two subscribing witnesses.

JAMES F. McLAUGHLIN.

Witnesses:
HERBERT P. KER,
H. F. REARDON.